United States Patent [19]
Shih et al.

[11] Patent Number: 5,293,609
[45] Date of Patent: Mar. 8, 1994

[54] HIT-DENSITY-BASED REPLACEMENT FOR DATA CACHE WITH PREFETCHING

[75] Inventors: Feng-Hsien W. Shih, Yorktown Heights, N.Y.; James F. Macon, Jr., Boynton Beach, Fla.; Shauchi Ong, Pleasantville, N.Y.

[73] Assignee: International Business Machines Corporation, Armonk, N.Y.

[21] Appl. No.: 688,732

[22] Filed: Apr. 19, 1991

[51] Int. Cl.$^5$ .................................................. G06F 12/12
[52] U.S. Cl. ............................ 395/425; 364/DIG. 1; 364/255.7; 364/246.12
[58] Field of Search ... 364/200 MS File, 900 MS File; 395/400, 425

[56] References Cited

U.S. PATENT DOCUMENTS

| | | | |
|---|---|---|---|
| 4,466,059 | 8/1984 | Bastian et al. | 395/250 |
| 4,489,378 | 12/1984 | Dixon et al. | 395/425 |
| 4,807,110 | 2/1989 | Pomerene et al. | 395/425 |
| 4,928,239 | 2/1990 | Baum et al. | 395/425 |
| 5,146,578 | 9/1992 | Zangenehpour | 395/425 |
| 5,150,472 | 9/1992 | Blank et al. | 395/425 |

FOREIGN PATENT DOCUMENTS 0391871 10/1990 European Pat. Off. .

OTHER PUBLICATIONS

Effelsberg, "Principles of Database Buffer Management," ACM Trans. On Database Systems, vol. 9, No. 4, pp. 560–595, Dec. 1984.

Shih et al., "A File-Based Adaptive Prefetch Caching Design," IEEE International Conference on Computer Design: VLSI in Computers & Processors, Cambridge, Mass., Sep. 17–19, 1990.

"Biasing Cache Threshold Pointers Toward Less Pre-Staging," IBM Technical Disclosure Bulletin, vol. 31, No. 8, Jan., 1989.

*Primary Examiner*—Joseph L. Dixon
*Assistant Examiner*—Hiep T. Nguyen
*Attorney, Agent, or Firm*—Whitham & Marhoefer

[57] ABSTRACT

A least recently used cache replacement system in which the data cache is logically partitioned into two separate sections, demand and prefetch. A cache directory table and a least recently used table are used to maintain the cache. When a new demand data page is added to the cache, a most recently used (MRU) pointer is updated and points to this new page. When a prefetch page is added to the cache, the least recently used pointer of the demand section is updated with its backward pointer pointing to this new page. A cache hit on a demand of prefetch page moves that page to the top of the least recently used table. When a free page is needed in the cache, it is selected from the demand or prefetch sections of the memory based on a comparison of the demand hit density and the prefetch hit density so to maintain a balance between these two hit densities.

13 Claims, 7 Drawing Sheets

HIT-DENSITY-BASED REPLACEMENT FOR DATA CACHE WITH PREFETCHING

BACKGROUND OF THE INVENTION

1. Field of the Invention

The present invention generally relates to an improved method for managing the operation of a cache memory in which both demand and prefetched data can be stored, and more particularly to an improved method for allocating space in the memory between demand and prefetched data on the basis of frequency of use.

2. Description of the Prior Art

In many data processing systems, a high-speed memory commonly called a "cache" is provided between the working memory of the central processing unit and a main memory. The cache enables a relatively fast access to a subset of data which has been previously transferred from main memory to the cache and thus improves the overall speed of the data processing system. Commonly, data transfers from main memory to cache are in pages or blocks of data and include both demand data pages and prefetched data pages. Demand data is data transferred to the cache as a result of a specific request from the central processing unit. When transferring demand data to the cache, it is advantageous to also transfer additional unrequested data (i.e. prefetched data) at the same time if it is likely the additional data will be soon requested.

When a cache is filled, data must be removed from the cache when new data is written in. Commonly, data cache management systems use the frequency of use of data in the cache as a criteria for selecting data to be removed from the cache. Least recently used (LRU) is a common criteria for replacement because of its simplicity and efficiency.

In the prior art, in replacing data in the cache, demand and prefetched data has been treated equally, without regard to the size of the incoming data of each type. Under this condition too large a portion (in terms of finding demanded data in cache) of the total cache storage capacity may be allocated to store prefetched data, especially when large amounts of data are prefetched in connection with each main memory demand data access.

U.S. Pat. No. 4,489,378, entitled Automatic Adjustment of the Quantity of Prefetch Data in a Disk Cache Operation, describes a dynamic mechanism to determine the number of prefetched data blocks in each disk cache operation. U.S. Pat. No. 4,807,110, entitled Prefetching System for a Cache Having a Second Directory for Sequentially Accessed Blocks, describes a way to select the data blocks for prefetching using two-level cache directories. Both these patents consider prefetching in the cache operation but use a conventional Least Recently Used (LRU) scheme for replacement.

SUMMARY OF THE INVENTION

An object of this invention is the provision of a cache management data system that automatically adjusts the size of the storage areas of cache allocated for demand and prefetched data to balance the allocated areas on the basis of area-performance (i.e. cache hit density) during operation; a system which operates independently of the prefetch algorithm used. A system which is simple and straightforward in its design.

Briefly, this invention contemplates the provision of a least recently used cache replacement system in which the data cache memory is logically partitioned into two separate sections, demand and prefetch. A cache directory table and a least recently used table are used to maintain the cache. When a new demand data page is added to the cache, a most recently used (MRU) pointer is updated and points to this new page. When a prefetch page is added to the cache, the least recently used pointer of demand section is updated with its backward pointer pointing to this new page. A cache hit on a page in the demand or prefetch section moves that page to the top of the least recently used table. When a free page is needed in the cache, it is selected from the demand or prefetch sections of the memory based on a comparison of the demand hit density and the prefetch hit density so as to maintain a balance between these two hit densities. The demand hit density is the ratio of the demand hit probability to the number of entries in the demand section of the least recently used table. Similarly, the prefetch hit density is the ratio of the prefetch probability to the number of entries in the prefetch section of the least recently used table.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is a flowchart of the overall design of the hit density based cache replacement operation; FIG. 4 is a flowchart showing the cache management operation; FIG. 5 is a flowchart of the new page addition operation; FIG. 6 is a flowchart of the hit density computation; and FIG. 7 is a flowchart of a window computation.

DETAILED DESCRIPTION OF A PREFERRED EMBODIMENT OF THE INVENTION

Figure 1:
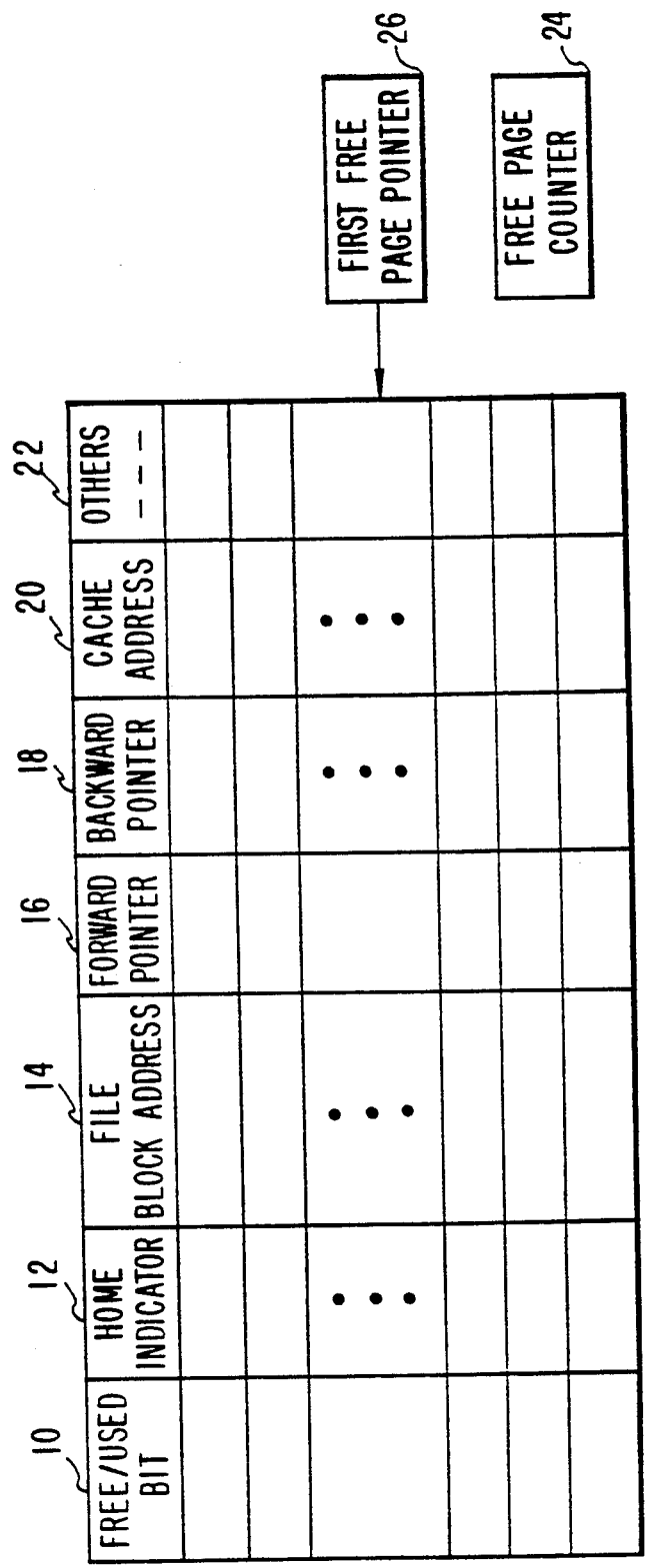
FIG. 1 is a pictorial representation of a cache directory table illustrating typical types of table entries for a cache management system in accordance with the teachings of this invention.

Referring now to FIG. 1, the cache directory table contains entries common to directory tables in prior art cache management systems. It contains a single bit entry 10 indicating whether a cell in cache is free or used, a home indicator 12 and a file block address 14. A forward pointer 16 and a backward pointer 18 provide addresses to next list entries. A cache address 20 is provided as well as information, as indicated at 22. A first free page pointer 26 provides the cache address of the free page or cell in cache next to be written to and a free page counter 24 keep a running total of the free pages in cache.

Figure 2:
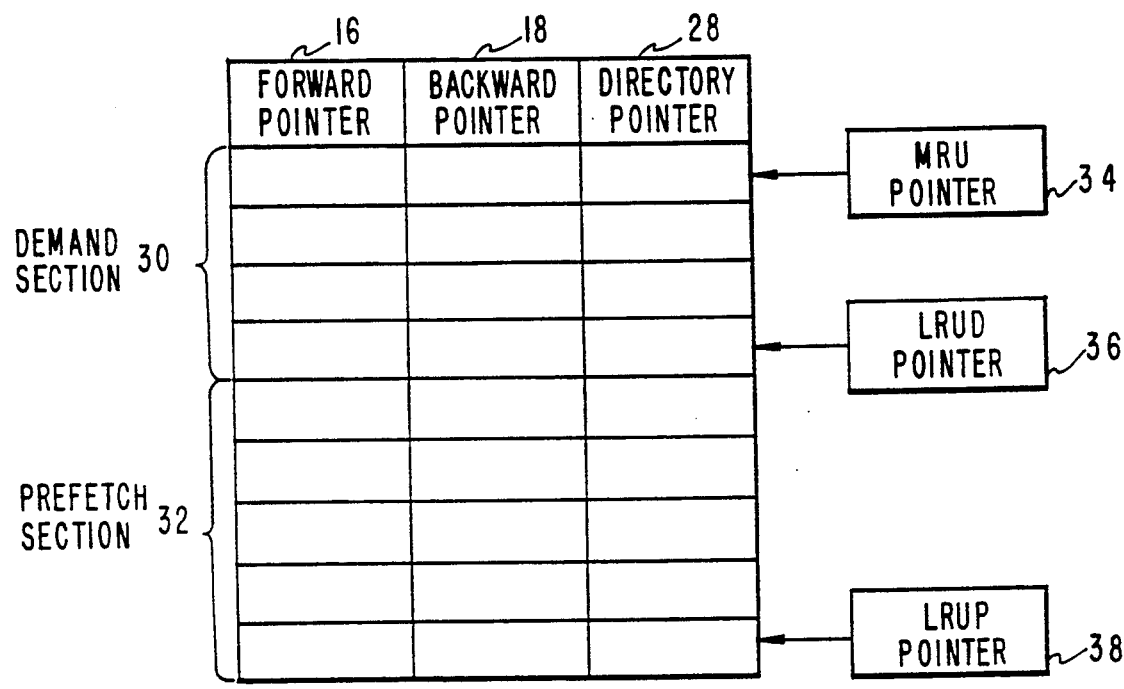
FIG. 2 is a pictorial representation of a Least Recently Used table illustrating a typical table organization for a cache management system in accordance with the teachings of this invention.

FIG. 2 shows the organization of the Least Recently Used table. Forward pointers 16 and backward pointers 18 along with directory table pointers 28 are maintained in a push down stack, logically separated into a demand section 30 and a prefetch section 32. In the table, the pointers 16, 18 and 28 for the most recently used page in cache are entered at the top of the table and indicated by a most recently used pointer 34. Pointers for demand pages newly transfer from main store are entered at the top of the table as most recently used. Pointers for new prefetch pages are entered at the top of the prefetch section of the table. A least recently used pointer 36 points to the last entry in the demand section of the table and another least recently used pointer 38 points to the last entry in the prefetch section of the table. It will be appreciated that in accordance with the teachings of this invention, the size of the demand section 30 and size of the prefetch section 32 can change depending on the hit density of the demand section relative to the hit density of the prefetch section.

In order to compute hit densities for both demand and prefetch sections of the cache, a cache history window is defined to limit the size of the historical data in the computation process; for example 32 input/output requests. The following Chart 1 defines the cache parameters used herein and Chart 2 defines the terms of the hit density computation.

---

Chart 1: Caching Parameter Definition o Cache History Windows: CHW(i) — The whole caching history is partitioned into CHW with each window contains the same number (say 32) of file I/O requests.

o In each CHW(i), $N_d(i)$ = total number of demand pages
$N_p(i)$ = total number of prefetch pages
$N_{dh}(i)$ = total number of demand hits
$N_{ph}(i)$ = total number of prefetch hits o History Working Set: The most recent set (e.g. 4 or 5) of windows selected for caching history computation.

o $N_d$ = number of demand pages in the current file I/O.
o $N_p$ = number of prefetch pages in the current I/O.
o $L_d$ = number of entries in the Demand Section of Least Recently Used (LRU) table.
o $L_p$ = number of entries in the Prefetch Section of LRU table.
o $N_{dt}, N_{pt}, N_{dht}, N_{pht}$ = accumulated parameter count.
o CWC = complete window count
o I count = file I/O count in the current windows.

---

Chart 2: Caching Hit Density Computation

Consider History Working Set =
{CHW(i), CHW(i + 1), CHW(i + 2), CHW(i + 3), CHW(i + 4)}

$$\text{Demand Hit Probability} = \frac{\sum_{k=i}^{i+4} N_{dh}(k)}{\sum_{k=i}^{i+4} N_d(k)}$$

$$\text{Prefetch Hit Probability} = \frac{\sum_{k=i}^{i+4} N_{ph}(k)}{\sum_{k=i}^{i+4} N_p(k)}$$

$$\text{Demand Hit Density (DHD)} = \frac{\text{Demand Hit Probability}}{L_d}$$

$$\text{Prefetch Hit Density (PHD)} = \frac{\text{Prefetch Hit Probability}}{L_p}$$

---

Figure 3:
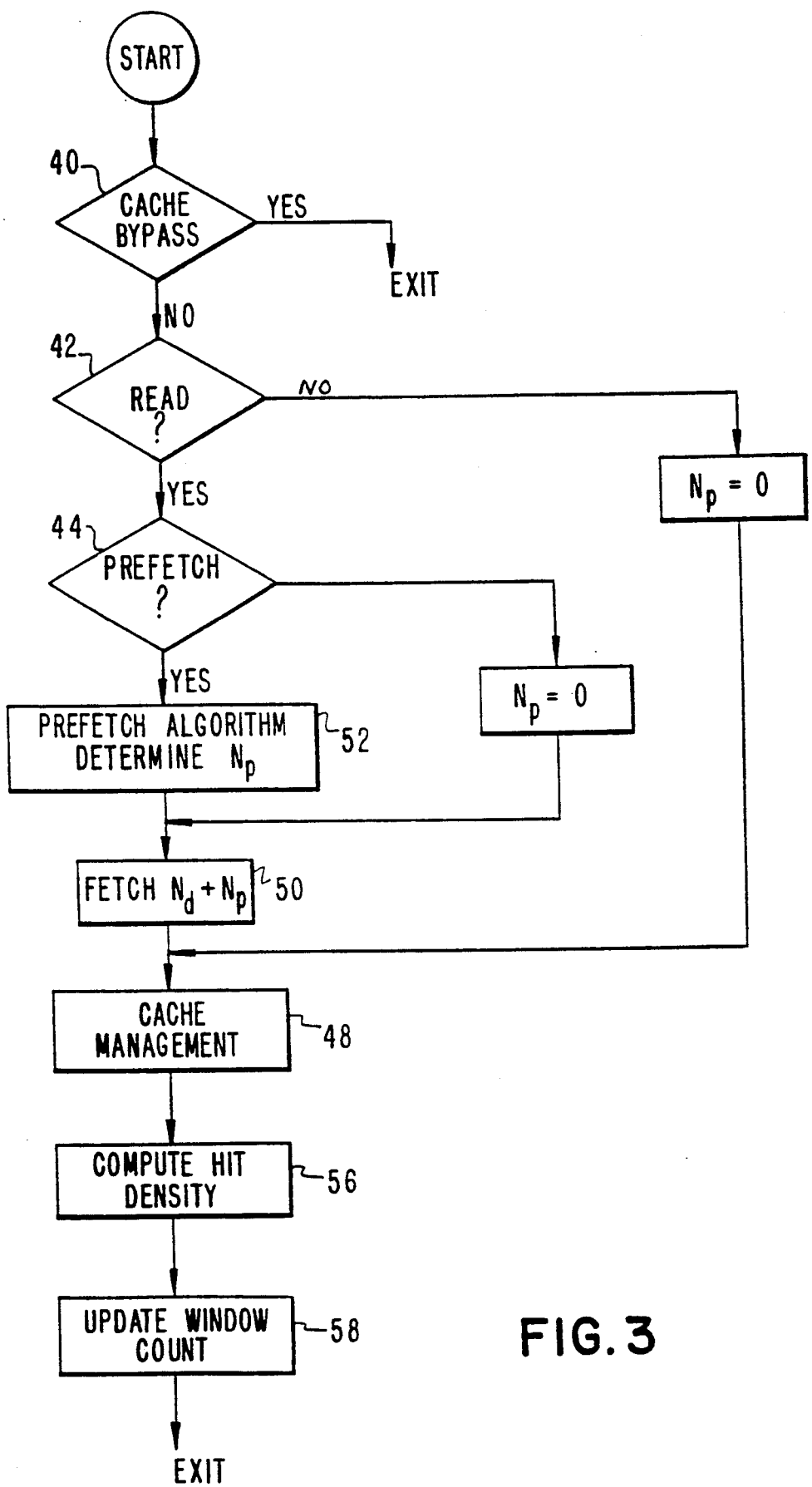
FIGS. 3 through 7 are flowcharts of a cache management system in accordance with this invention.

Referring now to FIG. 3, the overall cache management operation starts with an examination at block 40 of each input/output request to see if it includes a cache bypass instruction. If the cache is not bypasses, a determination at decision block 42 is made as to the type of cache request; read or write. Here it should be noted that all write to cache requests are treated as demand read requests. If the I/O request is a read from cache, at block 44 a determination is made whether or not it is a prefetch read. If it is not, or if the I/O is a write command (block 42), the number of prefetch pages $(n_p)$ in this I/O file is zero (0) and the operation advances to cache management block 48 in the case of a write request and to a fetch operation, block 50, in the case of a demand read. For a prefetch read, a prefetch algorithm determines the number of prefetch pages in the read request, block 52, and the pages are fetched at block 50. The remaining operations are: cache management, block 48, which will be explained in connection with FIGS. 4 and 5; a computation of hit density, block 56, which will be explained in connection with FIG. 6; and an updated window count, block 58, which will be explained in connection with FIG. 7.

Figure 4:
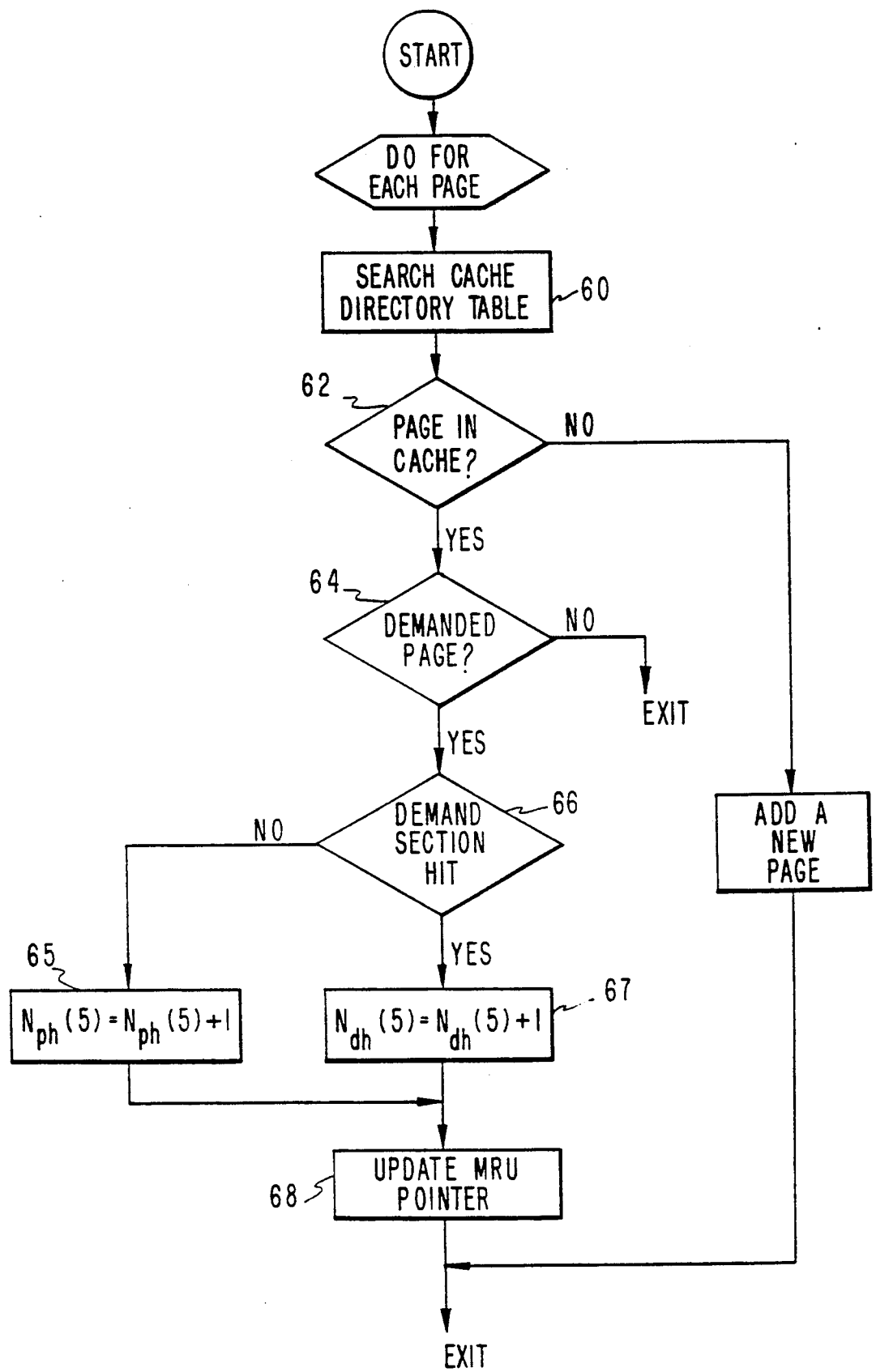

Referring now to FIG. 4, in the management of the cache, for each page fetched (block 50, FIG. 3), a search is made in the cache directory table (FIG. 1) to determine if the page is in cache, block 60. If the page is not in cache, the page is added, as will be explained in more detail in connection with FIG. 5. If the request page is in cache, block 62, a determination is made at block 64 whether or not it is the I/O page demanded. If a page is fetched other than the demanded page there is an exit from the remaining steps of the operation shown in this FIG. 4. For the demanded page in cache, a determination at block 66 whether the demanded page is in the demand section 30 or prefetch section 32. The total number of demand hits for the window set ($N_{dh}i$) or total number of prefetch hits for the window set ($N_{ph}i$) is updated accordingly (blocks 65 and 67 respectively) and the most recently use pointer is updated to point to the demanded page, block 68.

Figure 5:
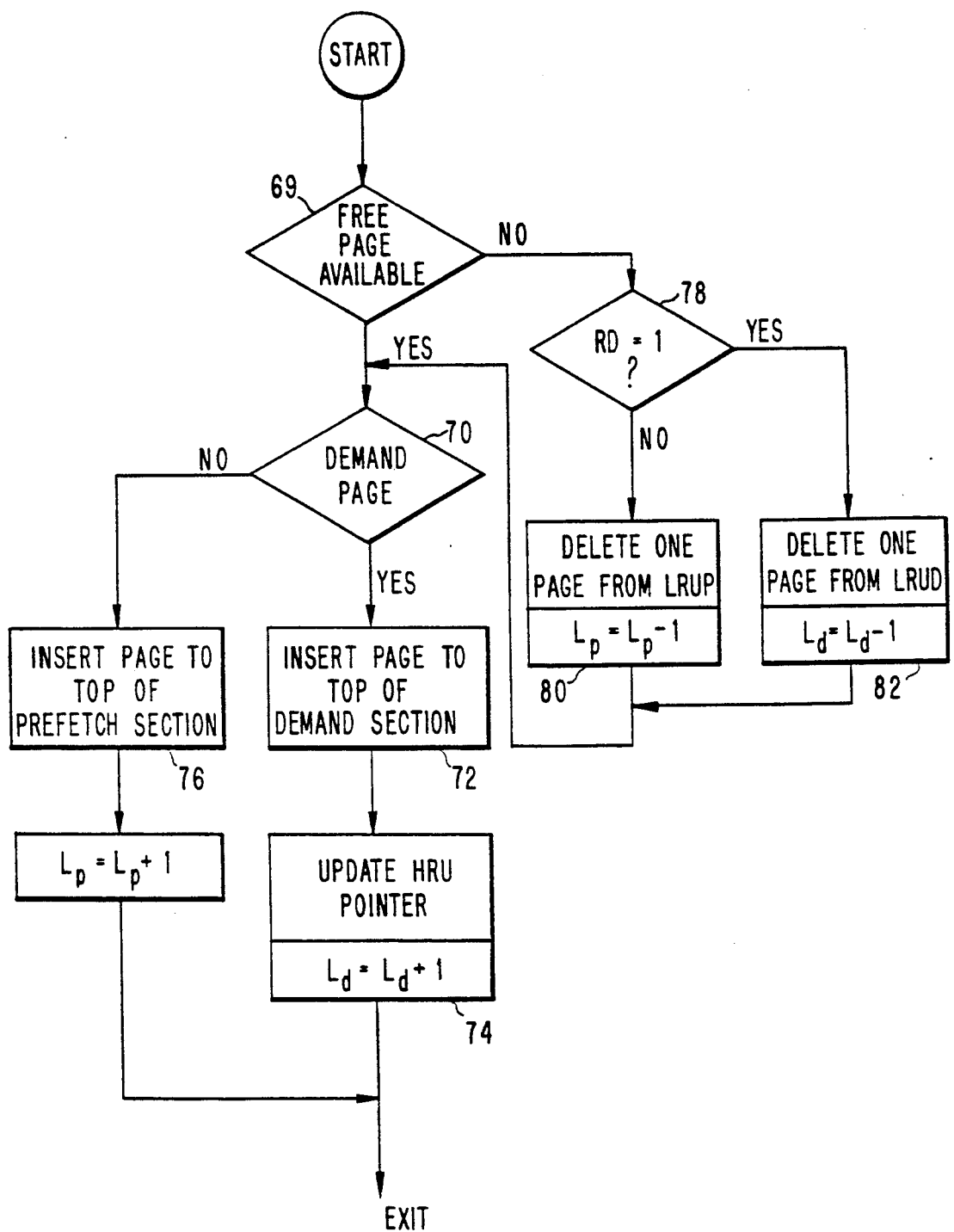

Referring now to FIG. 5, in adding a new page to the cache, an initial check is made at block 69 to determine if there is a free page or cell in the cache to accept the page to be added. If there is a free page available, a determination is made at block 70 as to the type of page to be added, demand or prefetch. If demand, the page is inserted at the top of the demand section of the cache, block 72, the demand section most recently used pointer is updated to point to this page, and the demand section entry count is updated, block 74. Similarly, if a prefetch page is added, it is placed at the top of the prefetch section of the cache at block 76 and the prefetch section entry count is updated.

If the determination at block 68 is that there is no free page available in the cache, a page is first deleted from either the demand or prefetch section of the cache. At block 78 a determination is made whether the demand hit density (DHD) is greater than or equal to the prefetch hit density (PHD) (DHD $\geq$ PHD); RD is assigned a value equal to 1 if DHD is less than PHD DHD < PHD. If the demand hit density is greater than or equal to the prefetch hit density, the least recently used page in the prefetch section of the cache is deleted, block 80, and the number of entries in the prefetch section counter is decremented by 1. Similarly, if the demand hit density is less than the prefetch hit density, the least recently used page in the demand section of the chase is deleted, block 82, and the number of entries in the demand section entry counter is decremented by 1.

Figure 6:
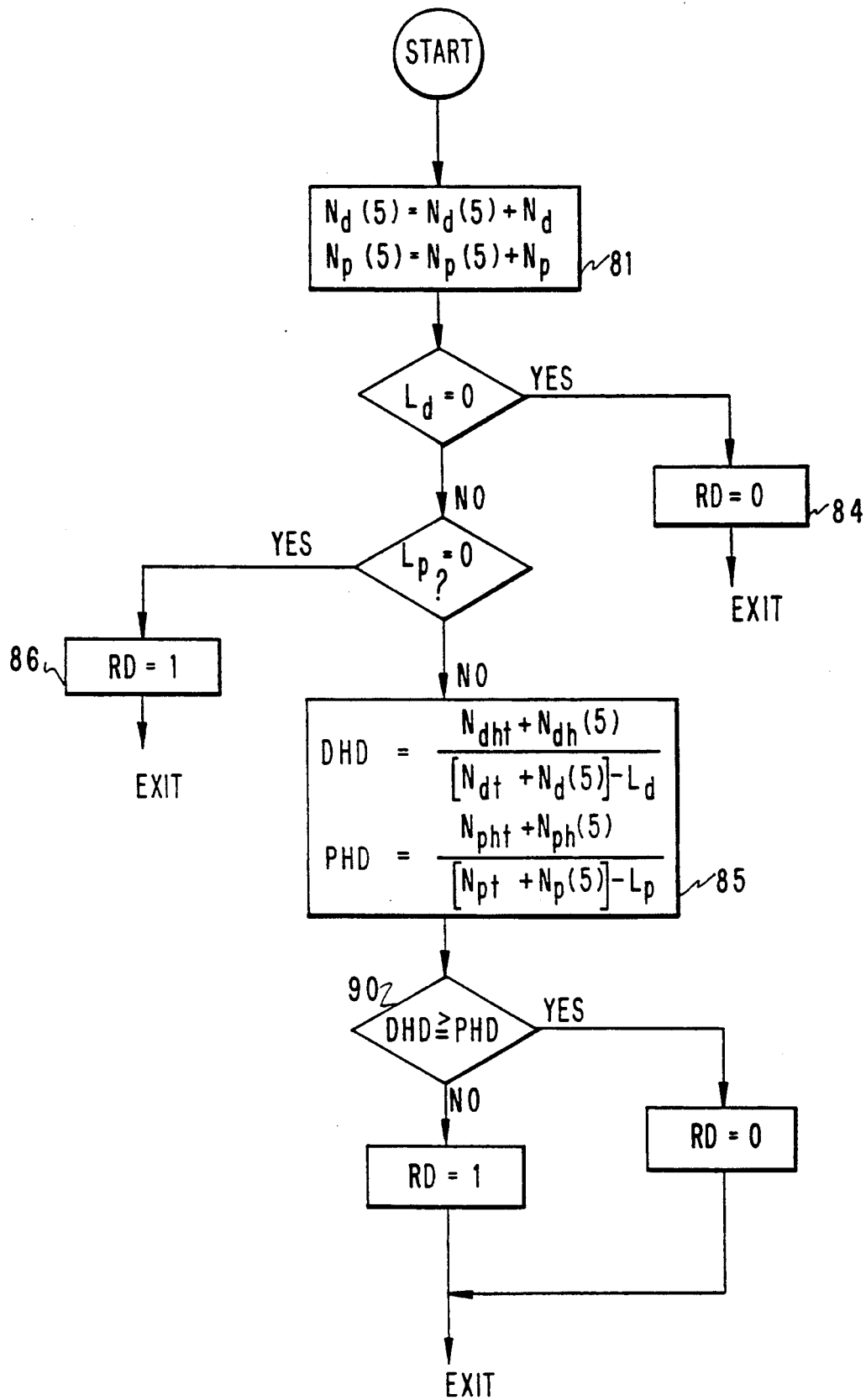

Referring now to FIG. 6, in computing the demand and prefetch hit densities, this example assumes a working history set of the five (5) most recent windows; i.e., $N_d(5)$ and $N_p(5)$. The operation starts, block 81 by updating the total number of demand $N_d(5)$ and prefetch $N_p(5)$ pages for the working history set by the number of pages $N_d$ of $N_p$ of the present I/O request. If the number of pages in the demand section $L_d$ is zero (0) RD is set to zero, block 84. Similarly, if the number of pages in the prefetch section is zero (0) RD is set for one (1), block 86. If there are demand and prefetch pages in the cache, the demand hit rate and the prefetch hit rate is calculated at block 86.

The demand hit density (DHD) is the ratio of the demand hit probability to the number of entries in the demand section of the cache. The demand hit probability is the ratio of the total number of demand hits for the working set history to the number of demand page requests for the history:

$$(DHD) = \frac{\text{Demand Hit Probability}}{L_d}$$

The prefetch hit density (PHD) is the ratio of the prefetch hit probability to the number of entries in the prefetch section of the cache. The prefetch hit probability is the ratio of the total number of prefetch hits for the working set history to the number of prefetch page requests for the history:

$$(PHD) = \frac{\text{Prefetch Hit Probability}}{L_p}$$

At block 90 a comparison is made between the demand hit density DHD and the prefetch hit density PHD; if DHD is greater than or equal to PHD, RD is assigned a value of zero (0). If DHD is less than PHD, RD is assigned a value of one (1).

Figure 7:
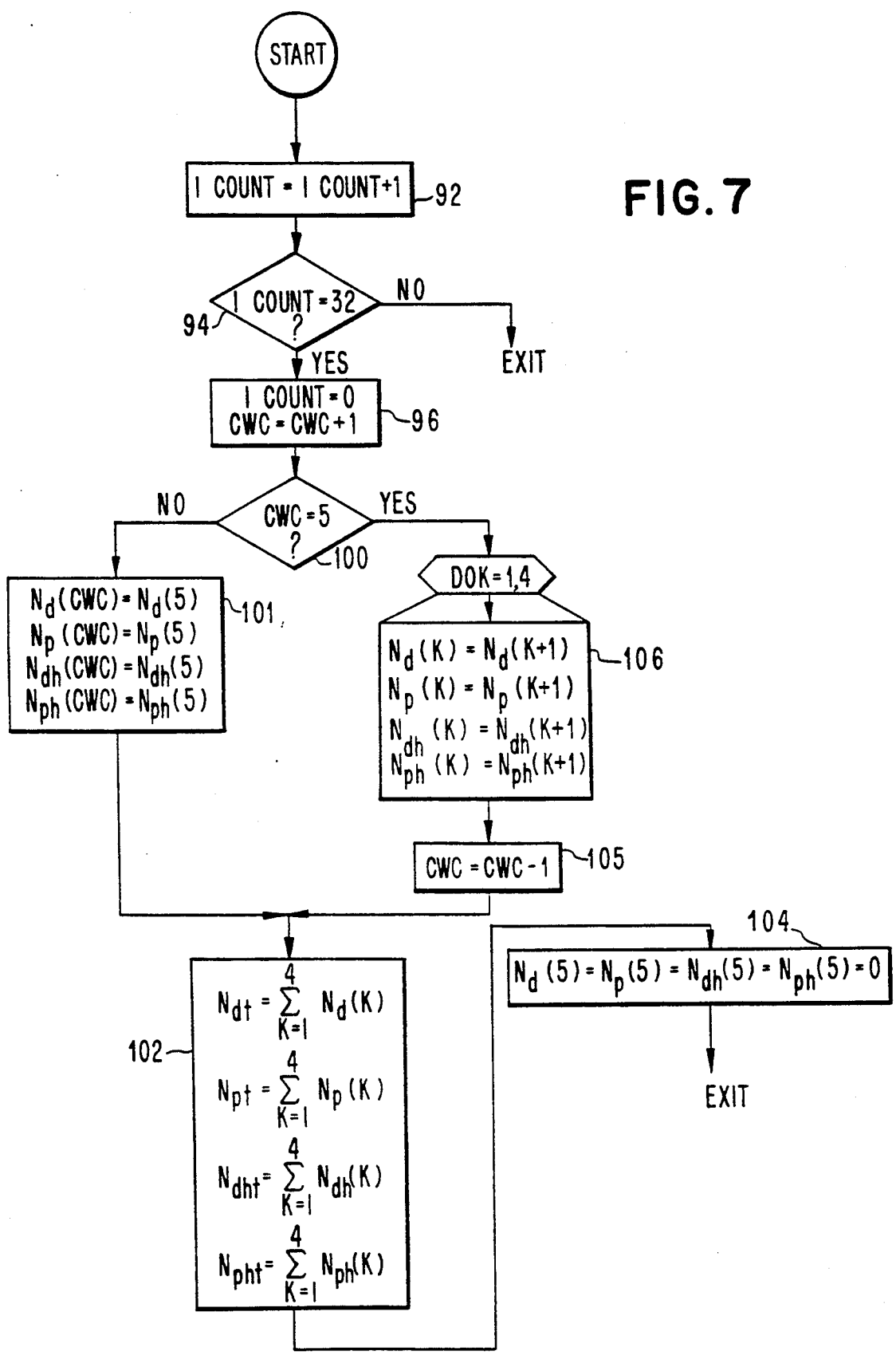

Referring now to FIG. 7, it shows the window update operation. This example assumes 32 I/O requests per window and five (5) windows in the rolling history set.

The operation starts in response to an input request "I" at block 92 by incrementing the request count "I" by one (1) in response to each request. The count is tested against the number of requests per window (e.g. 32 in this example) at block 94. A count of thirty-two indicates a complete window, and when this count is reached the complete window count increments by one (1), block 96. The complete window count is tested against the assigned working set history number, here five (5) at block 100. The remaining logic acts to keep the hit density data parameters current for a rolling history comprised of a set of windows by deleting the data for the oldest complete window in the set (here five) and adding the last window data each time a window is complete. A count of demands pages ($N_d$), prefetch pages ($N_p$), demands hits ($N_{dh}$) and prefetch hits ($N_{ph}$) for each window are determined, block 101. When a window is complete (i.e., CCW=5, blook 100) the oldest case history window in the set is in effect deleted at block 106, by incrementing the value K to K+1. The complete window count is decremented by one, block 105. The accumulated parameter counts for demand and prefetch page requests and demand and prefetch hits are determined for this updated set of windows in block 102. In block 104 the hit density data parameters of the complete window count (block 101) are reset to ZERO.

Thus it will be appreciated that the objects of the invention has been accomplished. The invention provides a cache management data system that automatically adjusts the size of the storage areas of cache allocated for demand and prefetched data to balance the allocated areas on the basis of area-performance (i.e. cache hit density) during operation; a system which operates independently of the prefetch algorithm used. A system which is simple and straightforward in its design.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer-implemented method for replacing data in a data cache store in which demand data is stored in a demand section of said data cache store and prefetch data is stored in a prefetch section of said data cache store, comprising in combination;
    storing demand data in said demand section;
    storing prefetch data in said prefetch section;
    determining a prefetch hit probability for said prefetch section on the basis of a ratio of a number of hits in said prefetch section to a number of prefetch requests;
    determining a demand hit probability for said demand section on the basis of a ratio of a number of hits in said demand section to a number of demand requests;
    determining a prefetch hit density for said prefetch section on the basis of a ratio of prefetch hit probability to a number of data entries in said prefetch section;
    determining a demand hit density for said demand section on the basis of a ratio of the demand hit probability to a number of data entries in said demand section; and
    replacing an entry in said demand section or an entry in said prefetch section on the basis of a comparison of the demand hit density and the prefetch hit density.

2. A method for replacing data in a data cache store as in claim 1 wherein an entry from said prefetch section is replaced if said demand hit density is greater than the prefetch hit density.

3. A method for replacing data in a data cache store as in claim 1 wherein an entry from said prefetch section is replaced if said demand hit density is equal to the prefetch hit density.

4. A method for replacing data in a data cache store as in claim 1 wherein said prefetch hit density and the demand hit density are determined on the basis of a predetermined number of input/output requests.

5. A method for replacing data in a data cache store as in claim 4 wherein an entry from said prefetch section is replaced if said demand hit density is greater than the prefetch hit density.

6. A method for replacing data in a data cache store as in claim 2 wherein an entry from said prefetch section is replaced if said demand hit density is equal to the prefetch hit density.

7. A method for replacing data in a data cache store as in claim 1 further including the steps of determining the least recently used data in the demand section, determining the least recently used data in the prefetch section, and replacing the least recently used data in said demand section or said prefetch section.

8. A method for replacing data in a data cache store as in claim 7 wherein an entry from said prefetch section is replaced if said demand hit density is greater than prefetch hit density.

9. A method for replacing data in a data cache store as in claim 7 wherein said prefetch hit density and the demand hit density are determined on the basis of a predetermined number of input/output requests.

10. A method for replacing data in a data cache store as in claim 9 further including the steps of determining the least recently used data in the demand section, determining the least recently used data in the prefetch section, and replacing the least recently used data in said demand section or said prefetch section.

11. A computer implemented method for replacing data in a data cache store in which demand data is stored in a demand section of said data cache store and prefetch data is stored in a prefetch section of said data cache store, comprising in combination;
storing demand data in said demand section;
storing prefetch data in said prefetch section; and
adjusting the number of said demand data section entries by replacing data in said demand section or said prefetch section based on a comparison of a number of data requests hits in said demand section, a number of data request hits in said prefetch section, a number of entries in said demand section, and a number of entries in said prefetch section.

12. A computer implemented method for replacing data in a data cache store in which demand data is stored in a demand section of said data cache store and prefetch data is stored in a prefetch section of said data cache store, comprising in combination;
storing demand data in said demand section;
storing prefetch data in said prefetch section; and
adjusting the number of said demand data section entries relative to the number of said prefetch data section entries by replacing data in said demand section or said prefetch section based on a comparison of a number of data request hits in said prefetch section.

13. A method for replacing data in a data cache store as in claim 12 further including the steps of determining to the least recently used data in the demand section, determining the least recently used data in the prefetch section, and replacing the least recently used data in said demand section or said prefetch section.

* * * * *